(12) United States Patent
Furuya

(10) Patent No.: US 10,080,072 B2
(45) Date of Patent: Sep. 18, 2018

(54) MICROPHONE

(71) Applicant: Kabushiki Kaisha Audio-Technica, Tokyo (JP)

(72) Inventor: Hiroaki Furuya, Tokyo (JP)

(73) Assignee: KABUSHIKI KAISHA AUDIO-TECHNICA, Tokyo (JP)

( * ) Notice: Subject to any disclaimer, the term of this patent is extended or adjusted under 35 U.S.C. 154(b) by 13 days.

(21) Appl. No.: 15/337,015

(22) Filed: Oct. 28, 2016

(65) Prior Publication Data

US 2017/0134840 A1  May 11, 2017

(30) Foreign Application Priority Data

Nov. 5, 2015  (JP) ................................. 2015-217279

(51) Int. Cl.
| | | |
|---|---|---|
| *H04R 1/04* | (2006.01) | |
| *H04R 1/08* | (2006.01) | |
| *F21V 33/00* | (2006.01) | |
| *F21V 19/00* | (2006.01) | |
| *F21V 8/00* | (2006.01) | |

(52) U.S. Cl.
CPC ............ *H04R 1/04* (2013.01); *F21V 19/0055* (2013.01); *F21V 33/0056* (2013.01); *G02B 6/0005* (2013.01); *H04R 1/083* (2013.01)

(58) Field of Classification Search
CPC .......... H04R 1/04; H04R 1/083; H04R 1/028; H04R 1/08; H04R 1/086; H04R 2201/028; H04R 2201/029; H04R 2201/02; F21V 33/0052; F21V 33/0056; F21V 19/003; F21V 19/0035; F21V 19/0045; F21V 19/0055; G02B 6/0096; G02B 6/0005; G02B 6/0006; G02B 6/0008; G02B 6/001;
(Continued)

(56) References Cited

U.S. PATENT DOCUMENTS

| | | | | |
|---|---|---|---|---|
| 5,289,355 A | * | 2/1994 | Cimock | A63J 17/00 362/109 |
| 5,994,842 A | * | 11/1999 | Wong | H05B 37/0236 315/129 |

(Continued)

FOREIGN PATENT DOCUMENTS

| | | | | |
|---|---|---|---|---|
| CN | 201629826 | * | 12/2009 | ............... H04R 1/08 |
| JP | 2015-70465 | | 4/2015 | |
| KR | 2010 0009467 U | | 9/2010 | |

*Primary Examiner* — Davetta W Goins
*Assistant Examiner* — Oyesola C Ojo
(74) *Attorney, Agent, or Firm* — W&C IP

(57) ABSTRACT

A microphone includes a tubular microphone case having conductivity, a circuit board on which a circuit is configured, the circuit being used for an operation of a microphone unit that converts an audio signal into an electrical signal, a light source that is accommodated in a position close to a first end of the microphone case and emits light, a light source mounting board on which the light source is placed, a holding member that has conductivity, holds the light source mounting board and the circuit board, and is fixed to the microphone case, and a light guide member including a protrusion. The holding member includes a light source mounting board accommodating portion that accommodates the light source mounting board, a circuit board accommodating portion that accommodates the circuit board, and a hole that can accept the protrusion.

7 Claims, 14 Drawing Sheets

(58) Field of Classification Search
CPC .. G02B 6/0033; G02B 6/0066; G02B 6/0076;
F21Y 2115/10
See application file for complete search history.

(56) References Cited

U.S. PATENT DOCUMENTS

| | | | | |
|---|---|---|---|---|
| 6,128,393 | A * | 10/2000 | Kondo | H04R 9/08 |
| | | | | 381/355 |
| 6,690,804 | B2 * | 2/2004 | Everett | F21V 33/0056 |
| | | | | 362/86 |
| 7,062,059 | B1 | 6/2006 | Bobisuthi | |
| 7,306,347 | B2 * | 12/2007 | Selover | F21V 33/0052 |
| | | | | 362/806 |
| 7,606,385 | B2 * | 10/2009 | Akino | H04R 1/083 |
| | | | | 381/355 |
| 8,447,056 | B2 * | 5/2013 | Akino | H04R 3/04 |
| | | | | 381/355 |
| 8,989,421 | B2 * | 3/2015 | Akino | H04R 1/086 |
| | | | | 381/355 |
| 9,332,333 | B2 * | 5/2016 | Akino | H04R 1/028 |
| 2002/0001190 | A1 * | 1/2002 | Everett | F21V 33/0056 |
| | | | | 362/86 |
| 2009/0034778 | A1 * | 2/2009 | Chi | H04R 1/028 |
| | | | | 381/394 |
| 2010/0189298 | A1 * | 7/2010 | Akino | H04M 1/035 |
| | | | | 381/356 |
| 2012/0002975 | A1 * | 1/2012 | Nakazawa | H04B 10/1141 |
| | | | | 398/132 |
| 2015/0092975 | A1 * | 4/2015 | Akino | H04R 1/08 |
| | | | | 381/355 |
| 2015/0304754 | A1 * | 10/2015 | Akino | H04R 1/086 |
| | | | | 381/359 |

* cited by examiner

THE RELATED ART

MICROPHONE

BACKGROUND

Technical Field

The present invention relates to a microphone.

Related Art

There is a demand by users of microphones, for example, gooseneck microphones used in conferences, speeches, and the like to visually identify a microphone in operation to identify a speaker. To respond to such a demand, microphones that enable an operation state to be visually recognized with a light emitting portion including a light source such as a light emitting diode (LED) are known.

Note that a technique related to a microphone including a light emitting portion for enabling an operation state to be visually recognized is disclosed (for example, JP 2015-70465 A).

SUMMARY

As illustrated in FIG. 14, in a microphone 100 of the related art, for example, a light source 132 is mounted on a light source mounting board 131 such that light mainly proceeds in the direction of a flexible pipe 107. The light source mounting board 131 is screwed to a coupler 106 made of a resin. In the microphone 100, an optically transmissive lens 105 made of a resin is provided in a periphery of a microphone case 101 in a side surface direction to emit light from the light source 132 to the outside.

By the way, a circuit board 102 on which electronic components are mounted is mounted in the microphone 100. These electronic components configure various circuits such as a field effect transistor (FET) as an impedance transducer, an amplifier circuit, and a low cut circuit, which are used for an operation of the microphone 100. In the microphone 100, the light source mounting board 131 is arranged to be separated from the circuit board 102 to shield the circuit board 102. The optically transmissive resin for emitting the light from the light source to the outside does not have an electromagnetic shield property, and the circuit board 102 can be shielded only when the circuit board 102 is separated from the light source mounting board 131.

Therefore, in the microphone 100, the light source mounting board 131 and the circuit board 102 are separated and arranged to shield the circuit board 102, and thus it is difficult to make the configuration compact.

An objective of the present invention is to improve an electrical shielding property in a microphone including a light emitting portion in a microphone case.

The present invention includes: a tubular microphone case having conductivity; a circuit board on which a circuit is configured, the circuit being used for an operation of a microphone unit that converts an audio signal into an electrical signal; a light source that is accommodated in a position close to a first end of the microphone case and emits light; a light source mounting board on which the light source is placed; a holding member that has conductivity, holds the light source mounting board and the circuit board, and is fixed to the microphone case; and a light guide member including a protrusion and having an optically transmissive property, wherein the holding member includes: a light source mounting board accommodating portion that accommodates the light source mounting board; a circuit board accommodating portion that accommodates the circuit board; and a hole capable of accepting the protrusion.

According to an embodiment of the present invention, the electrical shielding property can be improved in the microphone including the light emitting portion in the microphone case.

DETAILED DESCRIPTION

Hereinafter, an embodiment of a microphone according to the present invention will be described with reference to the drawings.

Configuration of Microphone

Figure 1:
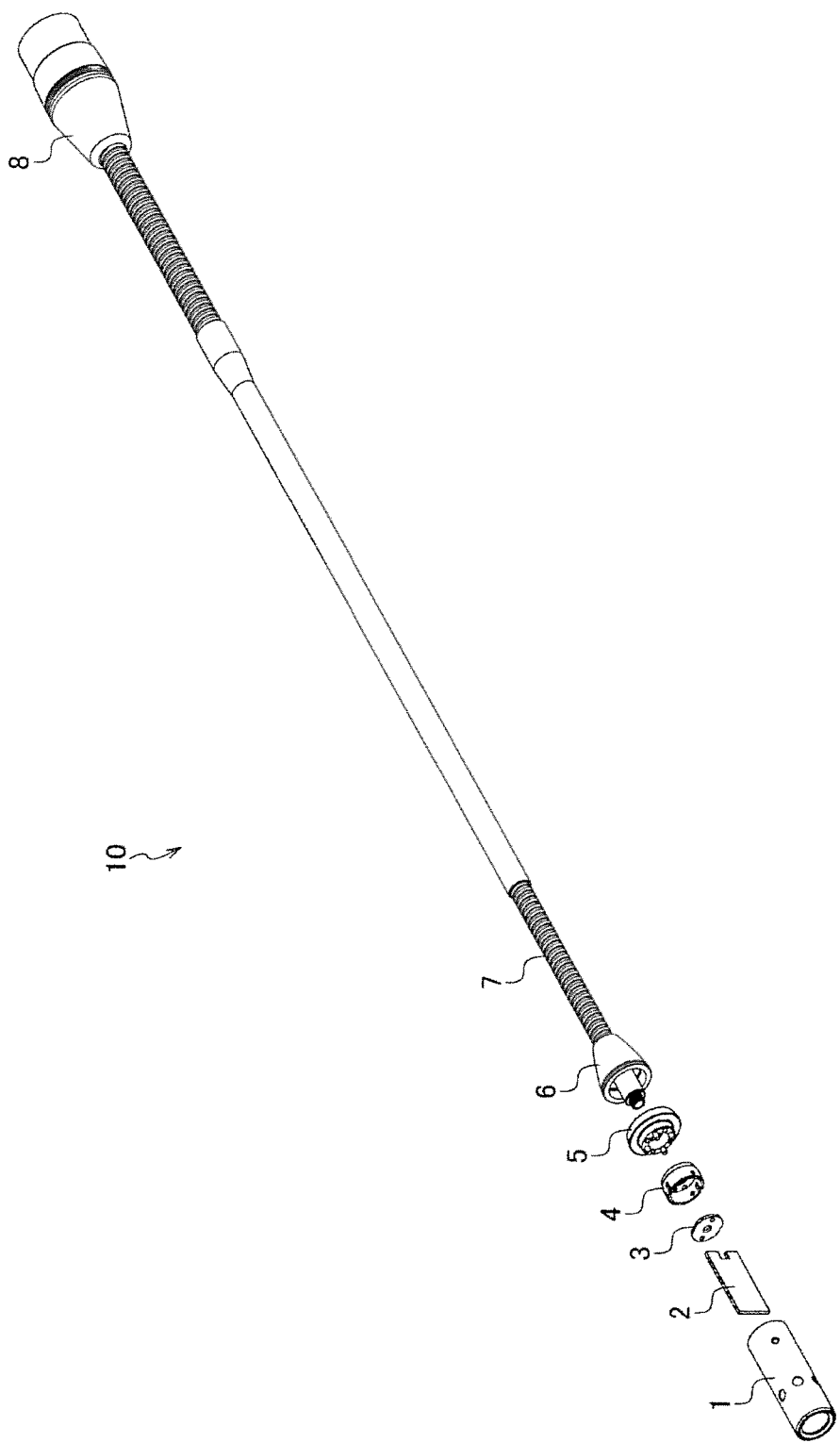
FIG. 1 is an exploded perspective view illustrating an embodiment of a microphone according to the present invention.

As illustrated in FIG. 1, a microphone 10 according to an embodiment of the present invention is, for example, a gooseneck microphone used in conferences, speeches, and the like. The microphone 10 includes a microphone case 1, a circuit board 2, a light source mounting board 3, a holding member 4, a light guide member 5, a coupler 6, a flexible pipe 7, and a base 8.

Figure 2:
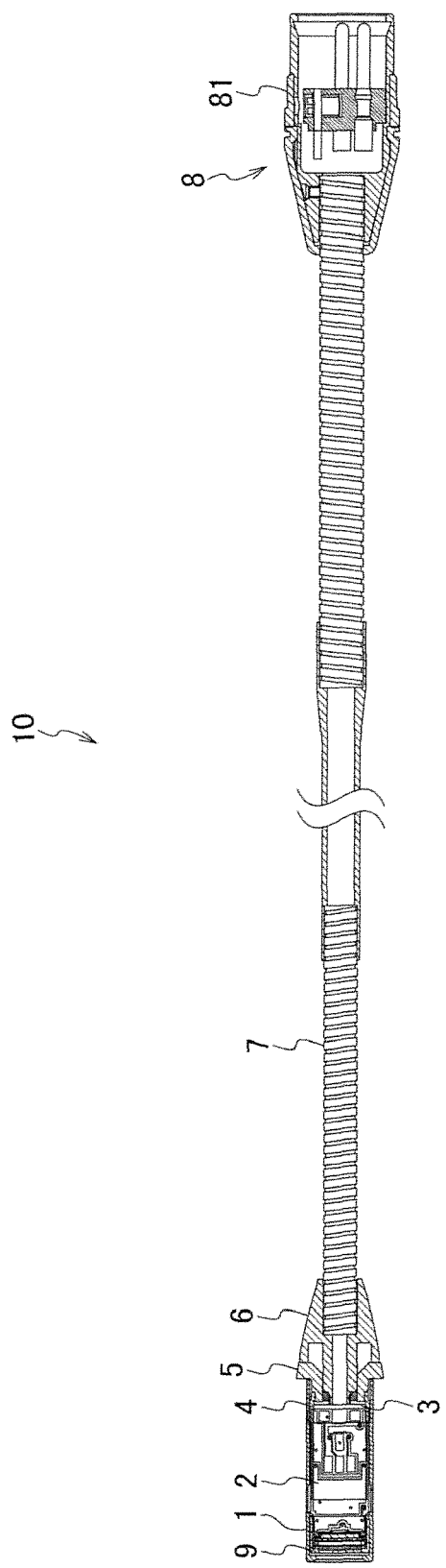
FIG. 2 is a side sectional view of the microphone.

As illustrated in FIG. 2, for example, the microphone case 1 is a tubular housing made of metal, more specifically, a cylindrical housing and having a hollow portion. In the description below, a front end (in the left direction on the sheet surface of FIG. 2) of the microphone case 1 is referred to as a first end, and a rear open end (in the right direction on the sheet surface of FIG. 2) of the microphone case 1 is referred to as a second end. The microphone case 1 accommodates a microphone unit 9 that converts an audio signal into an electrical signal, the circuit board 2, the light source mounting board 3, the holding member 4, and the light guide member 5.

Figure 3:
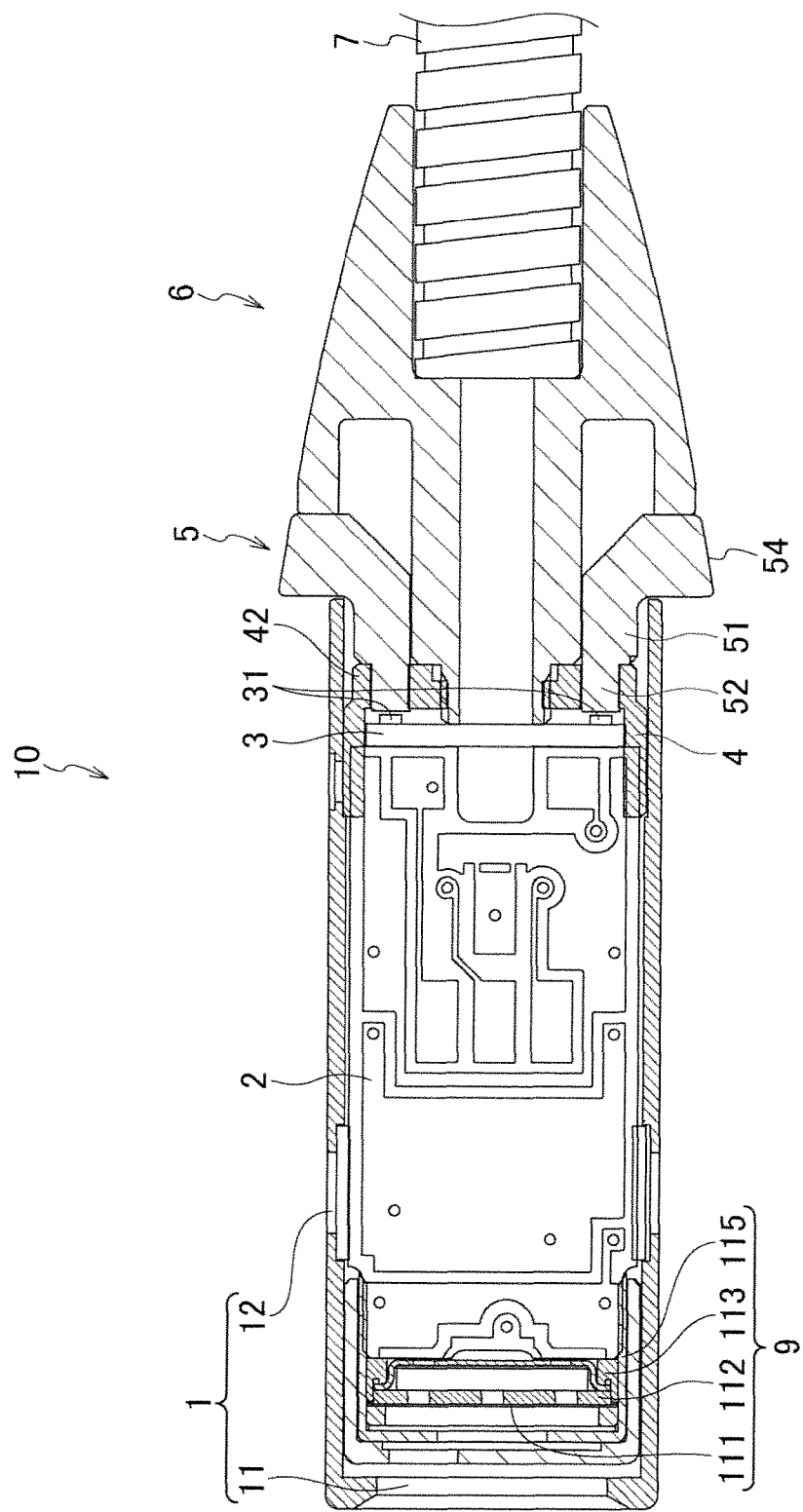
FIG. 3 is an enlarged side sectional view of a microphone case and its periphery of the microphone.

As illustrated in FIG. 3, the microphone case 1 includes a front opening portion 11 provided in front of the microphone unit 9, and a rear opening portion 12 provided in rear of the microphone unit 9. The microphone unit 9 is provided in a position close to the front in the microphone case 1, that is, near the front opening portion 11. The microphone unit 9 includes a diaphragm 111 that vibrates by sound waves entering from the outside through the front opening portion 11 and the rear opening portion 12, and a fixed electrode 112 that configures a capacitor together with the diaphragm 111. Furthermore, the microphone unit 9 includes an insulating holder 113 that holds the diaphragm. 111 and the fixed electrode 112, and a unit case 115 that holds the diaphragm 111, the fixed electrode 112, and the like.

In the microphone case 1, the circuit board 2 is provided closer to the rear than the microphone unit 9 is. The circuit board 2 is, for example, a typical flat plate-like printed board. Electronic components that configure various circuits used for an operation of the microphone 10, such as a field effect transistor (FET) as an impedance transducer, an amplifier circuit, and a low cut circuit are mounted on the circuit board 2.

Configuration of Light Source Mounting Board

The light source mounting board 3 is accommodated inside the microphone case 1. A light source 31 mounted on the light source mounting board 3 is accommodated to face a second end direction in the inside of the microphone case 1. The light source mounting board 3 is, for example, a typical flat plate-like printed board, and includes a hole that allows a cable to pass through in a center of the light source mounting board 3. A planar shape of the light source mounting board 3 is a substantially circular plate shape in an external form, corresponding to an inner shape of the microphone case 1. As the light source 31, a light emitting diode (LED) that is small and has small power consumption is desirably used, for example. For example, the power consumption of the light source 31 is just about power consumption by which the light source 31 can be driven by a phantom power supply of the microphone 10. The light source mounting board 3 is electrically connected to the circuit board 2 on a back surface of the light source mounting board 3, for power supply to the light source.

Configuration (1) of Light Guide Member

The light guide member 5 is a member that takes in the light from the light source 31 and guides the light in an outward direction of the microphone case 1. The light guide member 5 is formed of an optically transmissive material such as poly methyl methacrylate (PMMA) resin that is milky white as a whole. Note that the light guide member 5 may be formed of a material having a color other than milky white or a transparent material as long as the material is an optically transmissive material.

Figure 4:
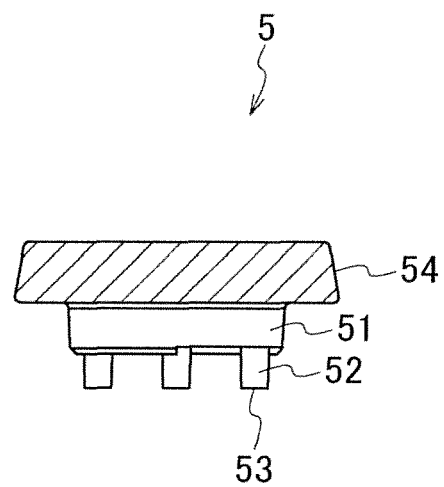
FIG. 4 is a side view of a light guide member of the microphone.
Figure 5:
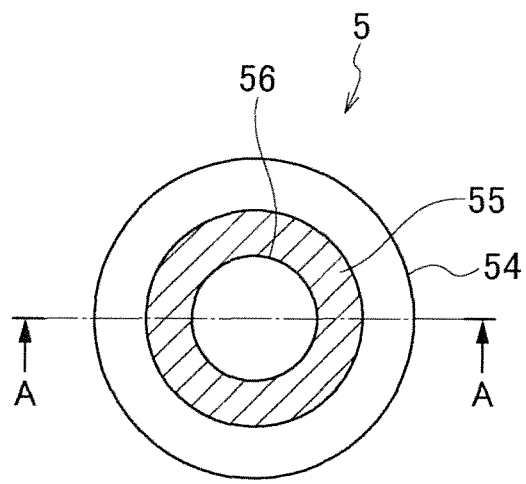
FIG. 5 is a front view of the light guide member.
Figure 6:
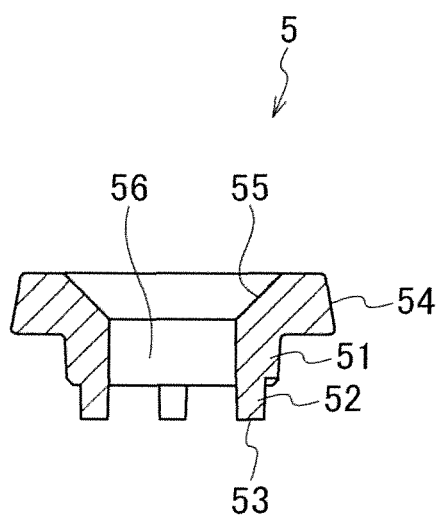
FIG. 6 is an A-A sectional view of the light guide member.

As illustrated in FIG. 4, the light guide member 5 has a substantially cylindrical external shape corresponding to the shape of the microphone case 1. The light guide member 5 includes a light guide portion main body 51, columnar portions 52, entering surfaces 53, and an emitting surface 54. As illustrated in FIGS. 5 and 6, the light guide member 5 includes a reflecting surface 55 and a hole 56.

The light guide portion main body 51 defines the entire shape of the light guide member 5. The light guide portion main body 51 guides the light from the light source 31, which has entered through the entering surfaces 53 and has passed through the columnar portions 52, into the reflecting surface 55. The columnar portion 52 has a protruding shape protruding from the light guide portion main body 51. The columnar portions 52 function as a light guide path like an optical fiber, which corresponds to the size of a light emitting surface of the light source 31 and guides the light from the light source 31 to the light guide portion main body 51. The entering surface 53 is provided on the columnar portion 52. The entering surface 53 is a surface parallel or nearly parallel to the light emitting surface of the light source 31, and allows the light from the light source 31 to efficiently enter the reflecting surface 55.

The reflecting surface 55 is positioned at an opposite side of the entering surface 53, that is, positioned close to the rear, in a state where the light guide member 5 is attached to the microphone case 1. The reflecting surface 55 is a totally reflecting surface integrally molded with the light guide portion main body 51, for example. The reflecting surface 55 has a substantially conical shape continuously expanding from the hole 56 in the center of the light guide member 5 toward a rear end. Because the reflecting surface 55 has the substantially conical shape, the light is reflected at the entire periphery of the emitting surface 54. Therefore, in the microphone 10, the emitting surface 54 seems to emit light in a ring shape. To diffuse the reflected light, emboss processing, blast processing, or the like may be applied to the reflecting surface 55. The reflecting surface 55 reflects the light having entered the light guide portion main body 51, and changes an advancing direction of the light into a side surface direction of the microphone case 1. In other words, the reflecting surface 55 guides the entering light to be emitted outward in a radial direction from the center of the light guide member 5.

The hole 56 is closely adjacent to a cylindrical portion 62 of the coupler 6 in a state where the light guide member 5 is attached to the microphone case 1.

The emitting surface 54 is provided to face a side surface of the microphone case 1, in the light guide member 5, and emits the light from the reflecting surface 55. Emboss processing, blast processing, or the like may be applied to the emitting surface 54 to diffuse the emitted light and enlarge a visual recognition angle.

Configuration of Holding Member

Figure 7:
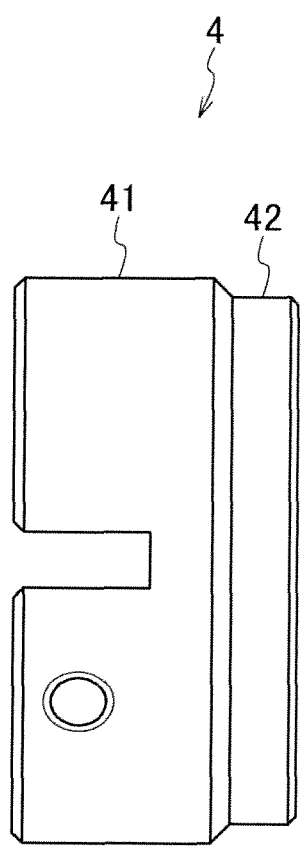
FIG. 7 is a side view of a holding portion of the microphone.

As illustrated in FIG. 7, the holding member 4 includes a light source holding portion 41 that holds the position of the light emitting surface of the light source 31, and a light guide member holding portion 42 that holds the position of the entering surface 53 of the light guide member 5. The holding member 4 is formed of a conductive member made of metal (for example, aluminum), and is electrically connected to the microphone case. The holding member 4 is fixed to the inside of the microphone case 1 together with the light source mounting board 3 held by the light source holding portion 41. Therefore, an outer diameter of the holding member 4 is smaller than an inner diameter of the microphone case 1.

Figure 8:
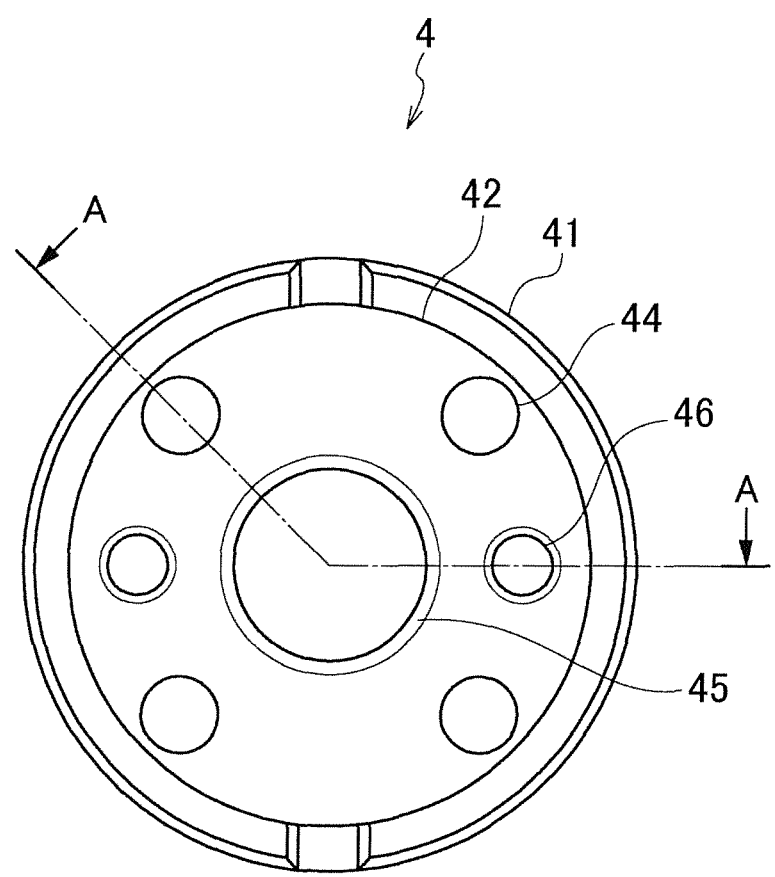
FIG. 8 is a front view of the holding portion.
Figure 9:
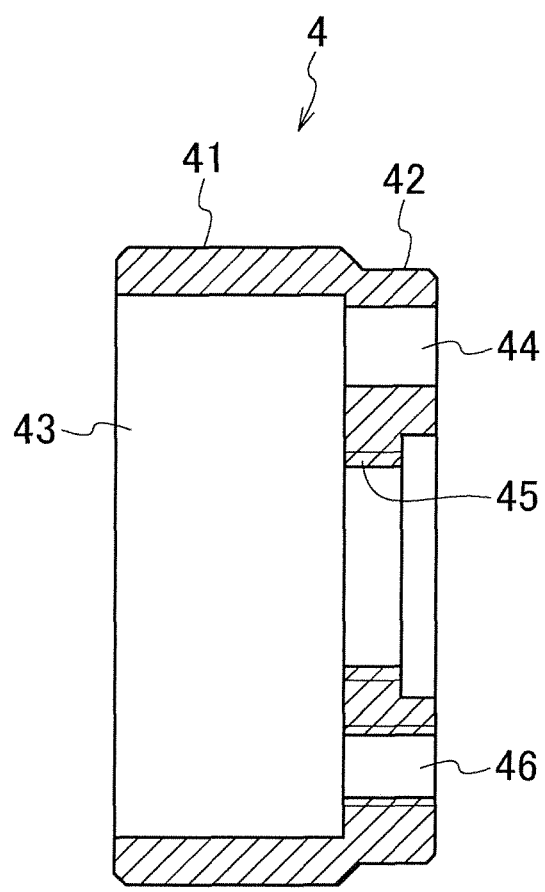
FIG. 9 is an A-A sectional view of the holding portion.

As illustrated in FIGS. 8 and 9, a hole-shaped light source mounting board accommodating portion 43 is formed inside the light source holding portion 41. A bottom surface of the light source mounting board accommodating portion 43 has a circular shape corresponding to the bottom surface of the microphone case 1 and the shape of the light source mounting board 3 so as to accommodate the light source mounting board 3. When the light source mounting board 3 is accommodated in the light source mounting board accommodating portion 43, the light source mounting board 3 is electrically connected to the conductive holding member 4.

Furthermore, the holding member 4 includes a hole-shaped columnar portion accepting portion 44 that can accept the columnar portion 52 of the light guide member 5, inside the light guide member holding portion 42. With the light source mounting board accommodating portion 43 and the columnar portion accepting portion 44, the light source 31 of the light source mounting board 3 and the entering surface 53 of the light guide member 5 are arranged in a closely adjacent manner. That is, with the holding member 4, the light from the light source 31 can efficiently enter the entering surface 53, and thus light use efficiency is improved in the microphone 10.

Furthermore, the columnar portion 52 is fit into the columnar portion accepting portion 44. When the columnar portion 52 and the columnar portion accepting portion 44 are fit into each other, positions of the light source 31 and the entering surface 53 can be easily fixed to each other. Furthermore, when the columnar portion 52 and the columnar portion accepting portion 44 are fit into each other, assembly of a light emitting portion becomes easy.

The number of the columnar portions 52 may be one or more than one. When there is a plurality of the columnar portions 52, the positions of the light source 31 and the entering surface 53 are further fixed to each other. Furthermore, when the columnar portions 52 respectively include the entering surfaces 53, the light from the light source 31 efficiently enters the reflecting surface 55.

Furthermore, the holding member 4 includes a female screw portion 45 for fixing the coupler 6, in a position closer to the center than the light guide member holding portion 42 is, inside the light guide member holding portion 42. A fixing structure between the female screw portion 45 and the coupler 6 will be described below. Furthermore, the holding member 4 includes a screw hole 46 that allows a screw for fixing the light source mounting board 3 to the holding member 4 to pass through, inside the light guide member holding portion 42.

Configuration of Coupler

As illustrated in FIGS. 1 and 2, the coupler 6 is connected to the microphone case 1 and the flexible pipe 7 in the case where the microphone case 10 is applied to a gooseneck microphone, for example. The coupler 6 is attached to a second end side of the microphone case 1 and covers the open end on the second end side, and the light guide member 5 and the like in a periphery of the open end. The coupler 6 is fixed to the holding member 4 and attached to the microphone case 1.

Figure 10:
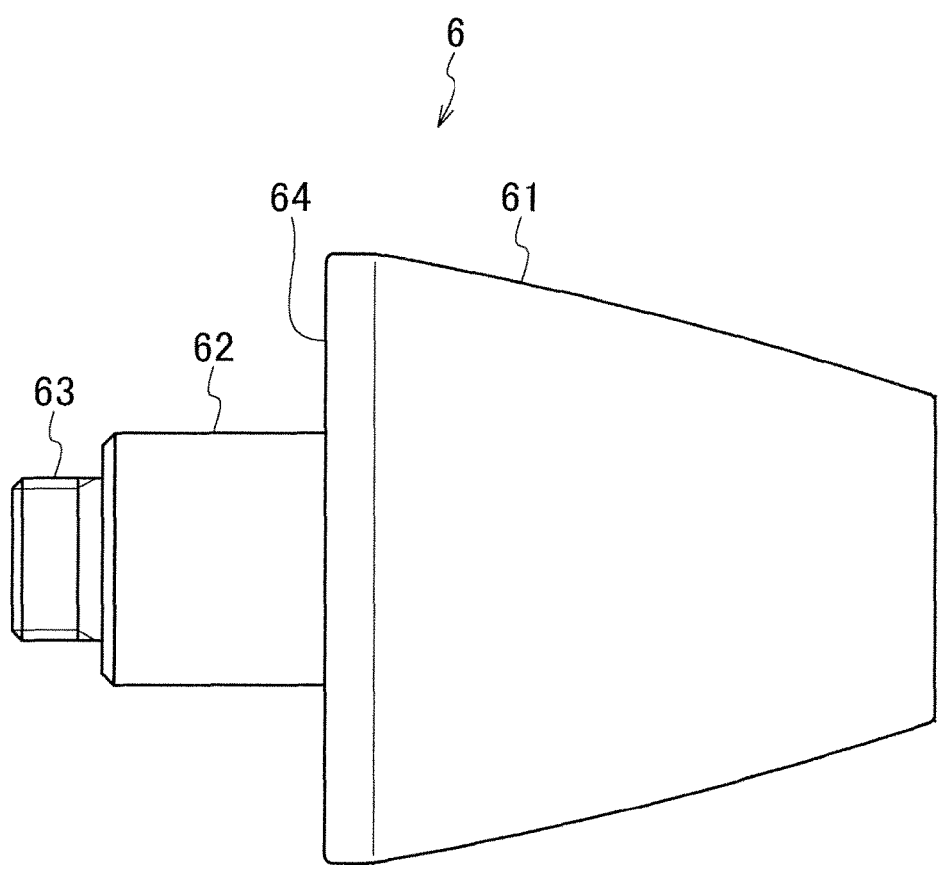
FIG. 10 is a side view of a coupler of the microphone.

As illustrated in FIG. 10, the coupler 6 includes a coupler main body 61, a cylindrical portion 62 having a substantially cylindrical shape, a male screw portion 63 provided at a tip end of the cylindrical portion 62, and a wall portion 64 that is a boundary portion between the coupler main body 61 and the cylindrical portion 62. For example, in the case where the microphone 10 is applied to a gooseneck microphone, the coupler 6 has a substantially conical shape. The male screw portion 63 is screwed into the female screw portion 45 of the holding member 4 described above. Therefore, when the male screw portion 63 is screwed into the female screw portion 45, the coupler 6 and the holding member 4 are fastened to each other.

Figure 11:
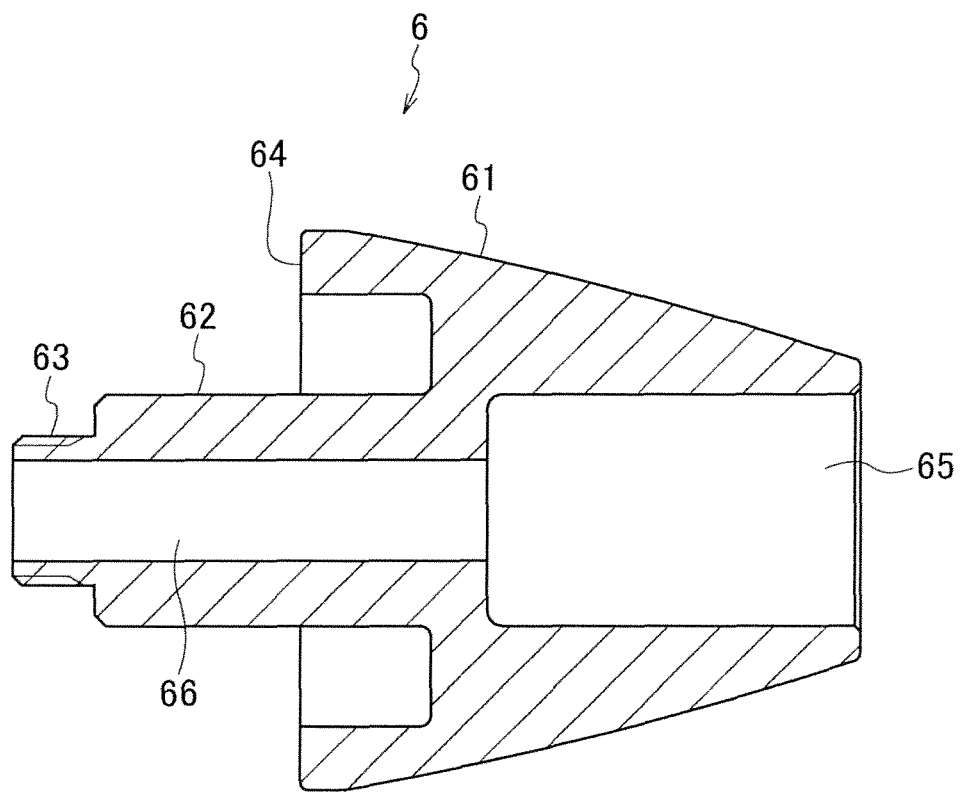
FIG. 11 is a side sectional view of the coupler.

As illustrated in FIG. 11, the coupler 6 includes a flexible pipe joint hole 65 for being joined with the flexible pipe 7. Furthermore, the coupler 6 includes a through hole 66 that penetrates from the male screw portion 63 to an end portion at the opposite side. Various cables to the microphone unit 9 are arranged in the through hole 66.

Configurations of Flexible Pipe and Base

As illustrated in FIG. 2, in the present embodiment, the microphone 10 includes the flexible pipe 7 assembled in the coupler 6 and supporting the microphone case 1. The flexible pipe 7 has a hollow cylindrical shape. The flexible pipe 7 includes a first wire material that is a steel wire with a circular section shape formed into a coil spring, and a second wire material that is a brass wire with a triangular section shape, formed into a coil spring and inserted into a gap between the first wire materials. The flexible pipe 7 is freely bendable while holding the tubular basic shape by friction caused between the first wire material and the second wire material, which are both plastically deformable.

The microphone 10 includes the base 8 that is joined with the flexible pipe 7 and supports the microphone case 1. As illustrated in FIG. 2, a connector 81 for electrically connecting the microphone 10 to other devices is provided inside the base 8.

Configuration of Light Emitting Portion

A configuration and a function of the light emitting portion of the microphone 10 will be described, the light emitting portion being formed of the light source mounting board 3, the light source 31, the holding member 4, the light guide member 5, and the coupler 6 described above.

The holding member 4 fixes the light emitting surface of the light source 31 mounted on the light source mounting board 3 and the entering surface 53 of the light guide member 5 in a closely adjacent state. The holding member 4 includes the columnar portion accepting portion 44 that can accept the columnar portion 52 of the light guide member 5. With such a configuration of the holding member 4, the light from the light source 31 efficiently enters the light guide member 5. That is, because the microphone 10 includes the holding member 4, the light use efficiency is improved. Therefore, even if a configuration using the light source 31 having small power consumption is used, the light guide member 5 lights up brightly in the microphone of the present embodiment.

As described above, the light guide member 5 includes the entering surface 53 that efficiently takes in the light from the light source 31, the reflecting surface 55 that totally reflects the light from the light source 31, and the emitting surface 54 that efficiently emits the light. Therefore, in the microphone 10, the light use efficiency is high and the light guide member 5 can light up brightly, even if the light source 31 having small power consumption is used. Furthermore, processing such as emboss processing to enhance light diffusibility is applied to the reflecting surface 55 and the emitting surface 54, and therefore, the light from the emitting surface 54 is diffused at a wider angle.

Furthermore, since the holding member 4 includes the female screw portion 45, the female screw portion 45 can be fastened to the male screw portion 63 of the coupler 6, and thus fixation between the microphone case 1 and the coupler 6 becomes easy. The holding member 4 is formed of a conductive material, as described above. Therefore, the holding member 4 can apply shielding to the circuit board 2 while accommodating the light source mounting board 3 in the same portion as the circuit board 2. With the holding member 4 made of a conductive material, the light source mounting board 3 and the circuit board 2 are arranged in a closely adjacent manner without being separated. Here, in the conventional microphone, to emit the light of the light emitting portion to the outside, a light source mounting board has to be arranged outside a circuit board.

Meanwhile, the structure of the present embodiment can integrally accommodate the light source mounting board 3 and the circuit board 2, and thus can reliably shield the light from the light source 31 while allowing the light from the light source 31 to be emitted. That is, the microphone unit, the circuit board 2, and the light source mounting board 3 are accommodated in the conductive microphone case 1 and the conductive holding member 4, and thus are electrically shielded, and only the light from the light source is emitted to the outside through the light guide member.

Furthermore, the shape of the cylindrical portion 62 of the coupler 6 corresponds to the hole 56 inside the reflecting surface 55 of the light guide member 5, and thus the position of the light guide member 5 can be held by the cylindrical portion 62.

As described above, according to the microphone 10 of the present embodiment, an excellent effect to improve the electrical shielding property in the microphone including the light emitting portion in the microphone case is exerted.

Configuration (2) of Light Guide Member

Figure 12:
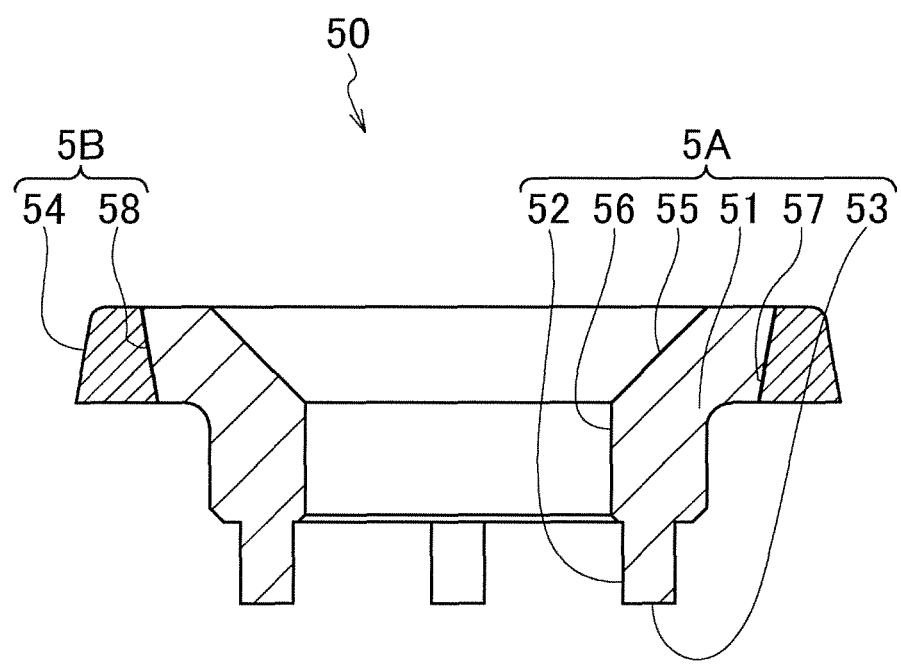
FIG. 12 is a side sectional view illustrating a light guide member of another embodiment of the microphone according to the present invention.
Figure 13:
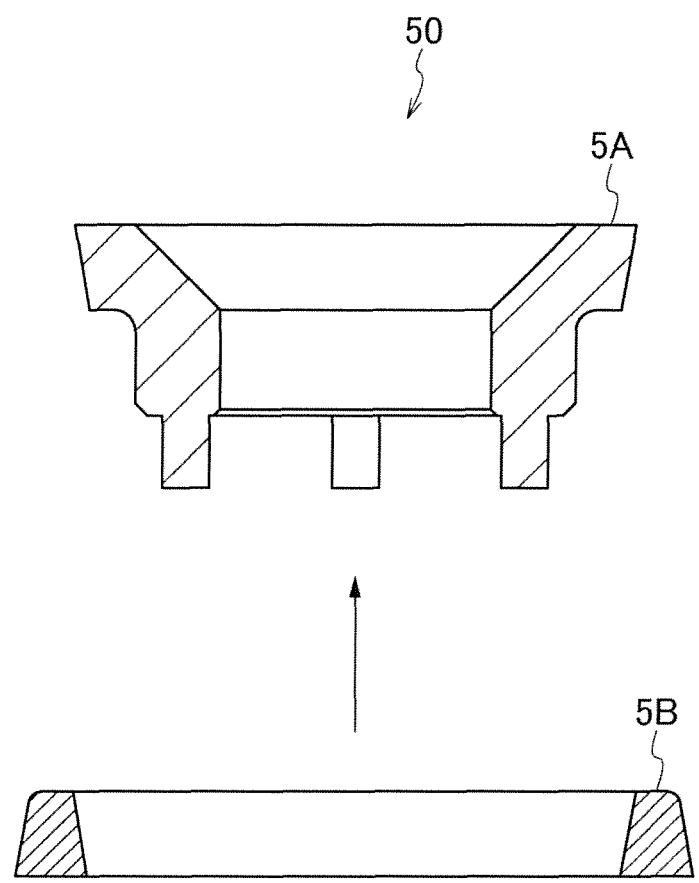
FIG. 13 is an exploded sectional view of the light guide member.
Figure 14:
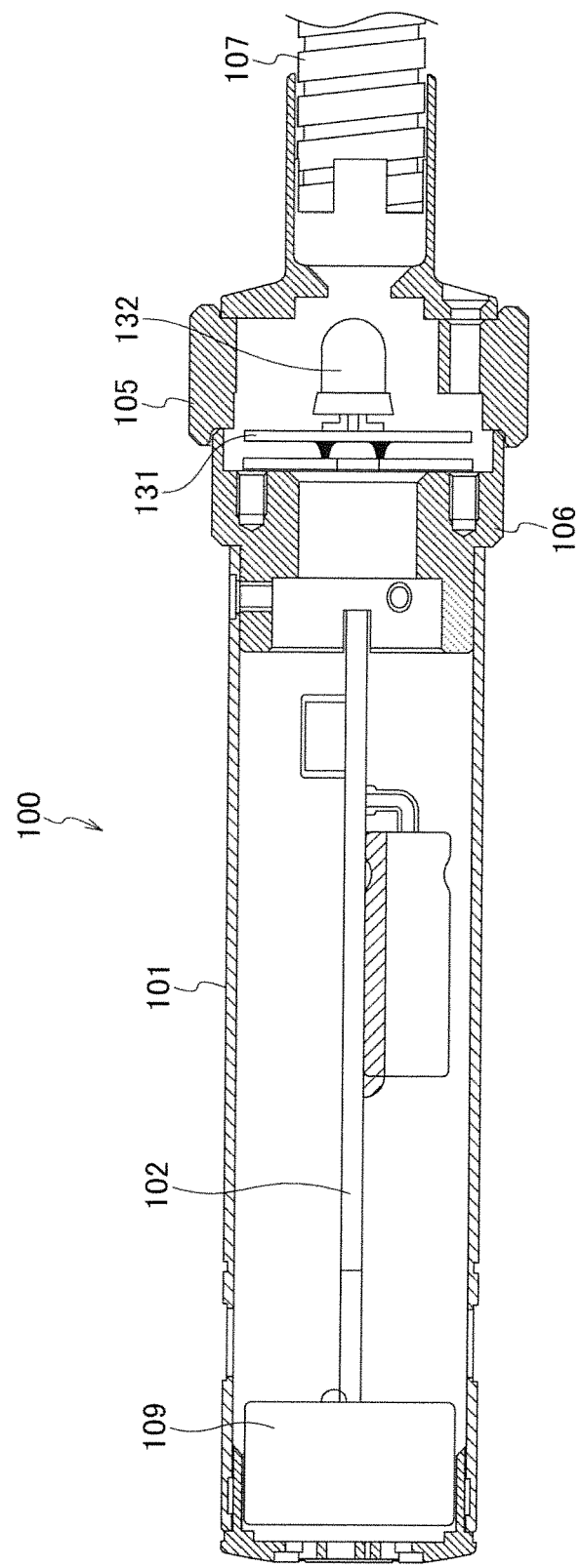
FIG. 14 is a side sectional view illustrating a conventional microphone.

As illustrated in FIGS. 12 and 13, in the microphone 10, a light guide member 50 may be divided into two members including a first light guide member 5A and a second light guide member 5B. The first light guide member 5A includes a light guide portion main body 51, a columnar portion 52, an entering surface 53, a reflecting surface 55, a hole 56, and an intermediate emitting surface 57. The second light guide member 5B includes an emitting surface 54 and an intermediate entering surface 58. In the light guide member 50, the light having entered the entering surface 53 of the first light guide member 5A goes through the columnar portion 52 and the light guide portion main body 51, is reflected at the reflecting surface 55, and is emitted through the intermediate emitting surface 57. The light emitted through the intermediate emitting surface 57 goes through the intermediate entering surface 58 of the second light guide member 5B, and is emitted through the emitting surface 54 to the outside.

Note that, when the back surface of the light source mounting board 3 is a solidly formed ground board, the light source mounting board 3 can be electrically connected to the holding member 4, and can be electrically separated from the circuit board 2. In this case, the shielding property of the microphone 10 can be improved by electrically shielding noises caused by the light source mounting board 3.

What is claimed is:

1. A microphone comprising:
a tubular microphone case having conductivity;
a circuit board on which a circuit is configured, the circuit being used for an operation of a microphone unit that converts an audio signal into an electrical signal;
a light source that is accommodated in a position close to a first end of the microphone case and emits light;
a light source mounting board on which the light source is placed;
a holding member that has conductivity, holds the light source mounting board and the circuit board, and is fixed to the microphone case; and
a light guide member including a protrusion and having an optically transmissive property, wherein
the holding member includes:
a light source mounting board accommodating portion that accommodates the light source mounting board;
a circuit board accommodating portion that accommodates the circuit board; and
a hole capable of accepting the protrusion,
wherein the hole is disposed corresponding to the position of the light source, and
wherein the protrusion passes through the hole and extends toward a light emitting surface of the light source.

2. The microphone according to claim 1, wherein
the light source mounting board and the light source mounting board accommodating portion have a shape corresponding to a shape of a bottom surface of the microphone case, and
the holding member is electrically connected to the microphone case.

3. The microphone according to claim 1, wherein
a bottom surface of the microphone case, the light source mounting board, and the light source mounting board accommodating portion have a circular shape.

4. The microphone according to claim 1, further comprising:
a coupler fixed to the holding member and attached to the microphone case, wherein
the holding member includes a female screw portion provided in a joint portion with the coupler, and
the coupler includes a male screw portion provided in a joint portion with the holding member.

5. The microphone according to claim 4, wherein
the light guide member guides light from the light source, and is arranged between the holding member and the coupler.

6. The microphone according to claim 4, wherein
the light guide member includes:
an entering surface provided on the protrusion, and to which the light from the light source enters;
a reflecting surface that reflects the light in a side surface direction of the microphone case; and
an emitting surface that emits the light from the reflecting surface.

7. The microphone according to claim 1, wherein
the holding member is formed of metal.

* * * * *